United States Patent
Berben et al.

(10) Patent No.: US 9,080,744 B2
(45) Date of Patent: Jul. 14, 2015

(54) LIGHT SYSTEM WITH INCREASED EFFICIENCY

(75) Inventors: Dirk Berben, Herdecke (DE); Joerg Frischeisen, Schwabmuenchen (DE); Frank Jermann, Koenigsbrunn (DE); Stefan Lange, Augsburg (DE)

(73) Assignee: Osram GmbH, Munich (DE)

( * ) Notice: Subject to any disclaimer, the term of this patent is extended or adjusted under 35 U.S.C. 154(b) by 176 days.

(21) Appl. No.: 13/876,174

(22) PCT Filed: Sep. 27, 2011

(86) PCT No.: PCT/EP2011/066724
§ 371 (c)(1),
(2), (4) Date: Mar. 27, 2013

(87) PCT Pub. No.: WO2012/049015
PCT Pub. Date: Apr. 19, 2012

(65) Prior Publication Data
US 2013/0188334 A1    Jul. 25, 2013

(30) Foreign Application Priority Data
Sep. 27, 2010    (DE) .......................... 10 2010 041 420

(51) Int. Cl.
| | |
|---|---|
| *F21V 9/16* | (2006.01) |
| *F21K 99/00* | (2010.01) |
| *F21Y 101/02* | (2006.01) |
| *F21Y 113/02* | (2006.01) |
| *H01L 25/075* | (2006.01) |
| *H01L 33/50* | (2010.01) |

(52) U.S. Cl.
CPC ... *F21V 9/16* (2013.01); *F21K 9/56* (2013.01); *F21K 9/135* (2013.01); *F21Y 2101/02* (2013.01); *F21Y 2113/02* (2013.01); *H01L 25/0753* (2013.01); *H01L 33/50* (2013.01)

(58) Field of Classification Search
CPC .......................................................... F21K 9/56
USPC ........................................ 362/84, 235, 249.02
See application file for complete search history.

(56) References Cited

U.S. PATENT DOCUMENTS

| | | | |
|---|---|---|---|
| 6,234,648 B1 | 5/2001 | Borner et al. | |
| 7,213,940 B1 | 5/2007 | Van De Ven et al. | |
| 7,404,652 B2 | 7/2008 | Ng et al. | |

(Continued)

FOREIGN PATENT DOCUMENTS

| | | |
|---|---|---|
| CN | 1790708 A | 6/2006 |
| EP | 1024399 A1 | 8/2000 |

(Continued)

OTHER PUBLICATIONS

Office Action issued for corresponding CN 201180046605.9 on Oct. 17, 2014 together with its English translation.

*Primary Examiner* — David V Bruce (57) ABSTRACT

A light system based on at least two chips, in particular LEDs containing chips may include at least one first chip capable of emitting a primary radiation, a layer containing a phosphor mounted in front of the first chip, for converting the primary radiation of the first chip into secondary radiation, at least one second chip capable of emitting a second primary radiation with a greater wavelength than the primary radiation, wherein the layer is arranged spaced apart from the first chip, wherein the second chip is arranged in such a way that its radiation is substantially not absorbed by the phosphor.

14 Claims, 5 Drawing Sheets

(56) References Cited

U.S. PATENT DOCUMENTS

| | | | |
|---|---|---|---|
| 8,491,140 B2 * | 7/2013 | Van De Ven et al. | 362/84 |
| 2004/0207313 A1 | 10/2004 | Omoto et al. | |
| 2007/0223219 A1 | 9/2007 | Medendorp, Jr. et al. | |
| 2010/0290208 A1 * | 11/2010 | Pickard | 362/84 |

FOREIGN PATENT DOCUMENTS

| | | |
|---|---|---|
| WO | 2010052640 A1 | 5/2010 |
| WO | 2010132150 A1 | 11/2010 |

* cited by examiner

FIG 6

LIGHT SYSTEM WITH INCREASED EFFICIENCY

RELATED APPLICATIONS

The present application is a national stage entry according to 35 U.S.C. §371 of PCT application No.: PCT/EP2011/066724 filed on Sep. 27, 2011, which claims priority from German application No.: 10 2010 041 420.4 filed on Sep. 27, 2010.

TECHNICAL FIELD

Various embodiments are based on a light system with increased efficiency. Such light systems are in particular suitable for general lighting.

BACKGROUND

U.S. Pat. No. 6,234,648 discloses a light system, in which blue LEDs and red LEDs are used together with a phosphor, which converts the radiation from the blue LED into green radiation, wherein the phosphor is applied at a distance from the blue LED (so-called remote phosphor concept). One disadvantage with this remote phosphor concept is the fact that the light from the red LEDs likewise needs to pass through the phosphor which acts as converter. As a result of scattering and residual absorption in the green phosphor, efficiency in the red spectral range is lost here.

SUMMARY

Various embodiments provide a light system with the remote phosphor concept which overcomes this disadvantage and manages without any loss in efficiency in the red spectral range. In particular, the emission of red light is intended to be decoupled from the converter without disadvantageously influencing the light mixing.

According to various embodiments, a light system on the basis of a conversion LED and a pure LED, in particular a red LED, is now provided.

In this case, a high degree of efficiency and uniformity of the emission is achieved.

In the case of transmissive remote phosphor approaches with conversion LED and admixing of red using individual red LEDs, the problem arises that the red light needs to be transmitted by the phosphor layer on a carrier. Although the phosphor itself is practically absorption-free in the red spectral range, there is a disadvantage in terms of efficiency in the component part owing to the relatively large optical path length of the red light, more precisely owing to the reflectance of the phosphor layer. Various embodiments composed here increase efficiency.

Approaches to date with remote phosphor homogenize the red light admixed by red-emitting LEDs by virtue of the scattering of the phosphor on the carrier. All of the light-emitting component parts are fitted in a housing, a "light box" with various possible physical shapes. Owing to multiple reflections and scattering of the primary light (in this case in particular blue and red), homogenization takes place. Outside the light system, a homogeneous light emission results. The loss in efficiency of the red light owing to the multiple reflections in the "light box" is accepted.

According to various embodiments, a spatial separation of the blue and red light sources which are realized by a chip or an array of chips is provided. The red light is coupled into the carrier plate or substrate of the phosphor layer. The phosphor layer is in this case preferably applied "at the bottom" on the substrate, i.e. facing the blue light source. The red light is coupled in above the phosphor layer or above the entire substrate.

Particularly preferably, the substrate is so thick that the red chips can be applied to the lateral rim and radiate into the substrate. The carrier layer then acts as an optical waveguide and the scattering on the lower side of the substrate ensures diffuse coupling-out of the red light in the forward direction. In this case, firstly the boundary layer of the substrate at the bottom and secondly the phosphor applied thereto itself acts as reflector/scattering layer.

Alternatively, the array of the red LEDs can also point upwards at an angle in the radiation direction and the mixing takes place in a tubular optical waveguide etc. above the substrate.

One advantage with this arrangement consists in that the red light no longer needs to pass through the phosphor. No multiple reflections take place in the layer or this process is greatly suppressed as a coupling-out mechanism. A single scattering process of a red photon is sufficient for coupling out. Correspondingly, the loss processes occur to a lesser extent, and the efficiency is increased.

A light system is disclosed based on at least two chips, in particular LEDs containing chips, wherein a means for at least partially converting the radiation of a first chip is provided, wherein a layer containing a phosphor as conversion means is mounted in front of a first chip intended for the conversion, which phosphor-containing layer converts at least some of the primary radiation of the first chip into secondary radiation, wherein the second chip emits radiation with a greater wavelength than the first chip, wherein the layer is arranged spaced apart from the first chip, wherein the second chip is arranged in such a way that its radiation is substantially not absorbed by the phosphor.

In a further embodiment, the light system is configured such that the the first chip emits UV to blue, and the second chip emits yellow to red. In the case of a first UV chip, the phosphor is blue-emitting and the second LED is yellow-emitting. In the case of a blue-emitting first chip, the phosphor emits yellow to green, which affects the peak of the emission, and the second chip emits orange, magenta or red.

In a still further embodiment, the phosphor absorbs blue radiation and emits green to yellow radiation.

In a still further embodiment, at least one phosphor is selected from the group consisting of oxinitridosilicates, orthosilicates, sialons, garnets which are derived from YAG:Ce.

In a still further embodiment, the first chip is realized as an array on a substrate.

In a still further embodiment, the layer is applied to a transparent disk in front of the first chip in the radiation direction.

In a still further embodiment, the second chip is realized as an array which has been grouped externally around the rim of the disk and which is arranged in particular above the layer, when viewed in the radiation direction.

In a still further embodiment, the phosphor has a garnet which contains in particular gallium and aluminum.

In a still further embodiment, the light system has a pot-like housing, wherein the first chip is applied to the base of the pot, and wherein the layer acts as a cover for the pot.

In a still further embodiment, the second chip has been inserted upwards at an angle in the radiation direction.

In a still further embodiment, an optical element, in particular an optical waveguide, is applied above the disk, which optical element mixes the radiation of both chips to give white, in particular on the basis of the RGB mixing principle.

In a still further embodiment, the thickness of the substrate is sufficient to be able to arrange the second chips at the lateral rim of the substrate, with the result that the radiation from said chips is coupled into the substrate.

In a still further embodiment, the light system is an LED lamp, wherein the phosphor is applied to a first dome, which arches over the first chips, and wherein the second chips are positioned within a second dome, but at the same time outside the first dome, wherein the second dome has a scattering means for mixing the radiation of both chips.

In a still further embodiment, the LED lamp has a basic part, from which in particular the two domes arch, wherein the basic part has a peripheral circular ring, on which the second chips are mounted.

In a still further embodiment, the second chips are applied externally to the first dome, in particular to strip-like bands.

BRIEF DESCRIPTION OF THE DRAWINGS

In the drawings, like reference characters generally refer to the same parts throughout the different views. The drawings are not necessarily to scale, emphasis instead generally being replaced upon illustrating the principles of the invention. In the following description, various embodiments of the invention are described with reference to the following drawings, in which.

DETAILED DESCRIPTION

The following detailed description refers to the accompanying drawings that show, by way of illustration, specific details and embodiments in which the invention may be practiced.

Figure 1A:
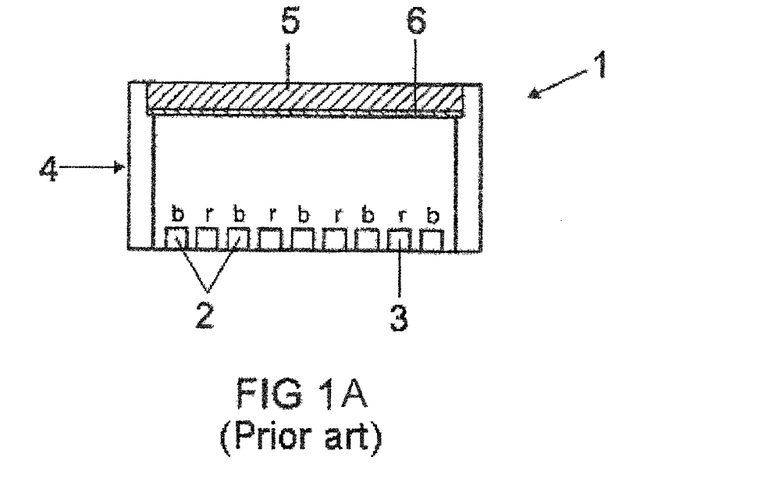
FIGS. 1A and 1B show a light system in accordance with the prior art.
Figure 1B:
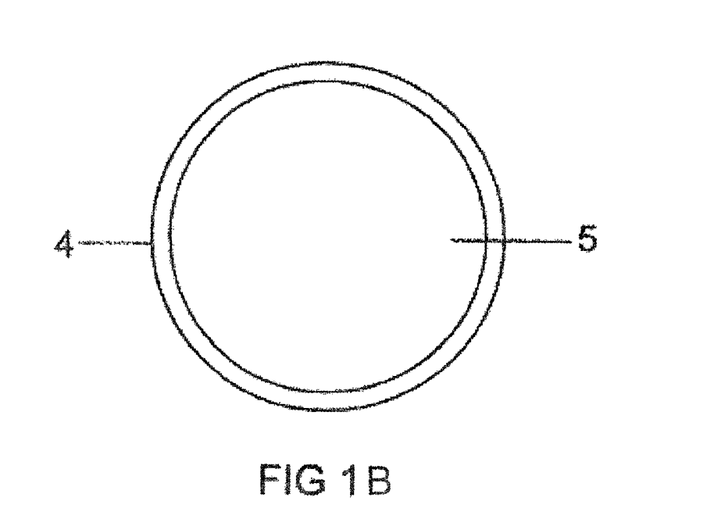

FIGS. 1A and 1B show the design of a light system 1 for white light on the RGB basis as is known per se, see in this regard U.S. Pat. No. 7,213,940, for example. The light source is a semi-conductor component with a blue (b) chip 2 of the type InGaN with a peak emission wavelength of 450 nm, for example. The array furthermore also contains red-emitting (r) LEDs 3.

The housing 4 is a pot-like light box. This box is closed off at the top by a phosphor layer 6 on a carrier or substrate 5. The phosphor is in particular garnet, derived from YAG:Ce. The phosphor layer 6 is located "at the bottom", on that side of the substrate which faces the interior of the light box. A fixed proportion of the blue light is absorbed or converted by the phosphor and the rest of the blue light is scattered. The backscattering is collected by the light box 4 with a white lining and is reflected again onto the phosphor layer 6. As a result of the diffuse reflection within the box, homogenization of the light emission is provided.

Figure 2A:
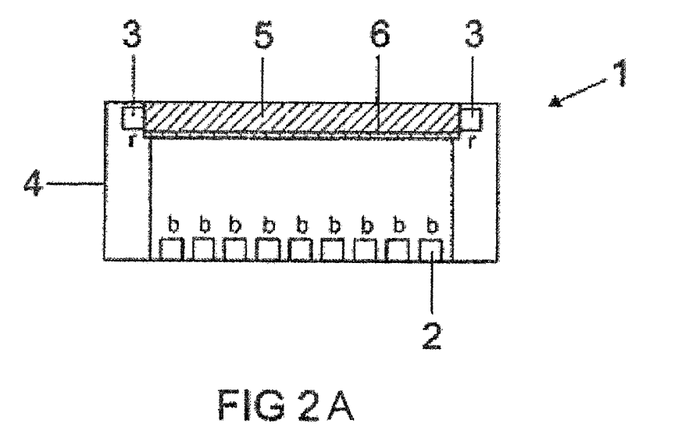
FIGS. 2A and 2B show a novel light system, first exemplary embodiment.
Figure 2B:
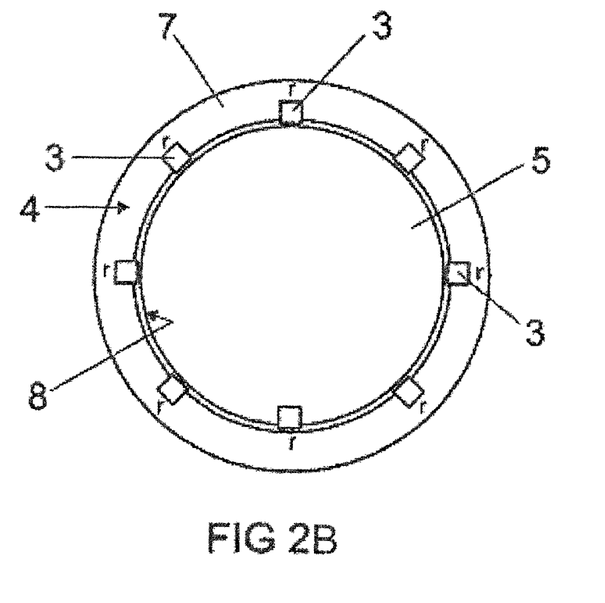

FIGS. 2A and 2B show a novel arrangement of a light system 1. Exclusively blue-emitting LEDs 2 are located within the light box 4. The red LEDs 3 are located at the cover-side rim of the box 4 and are coupled laterally into the carrier or substrate 5, which is transparent and preferably consists of glass or plastics. The side face 7 of the carrier next to and between the red LEDs 3 is preferably coated with a diffuse reflector material, with a suitable material being $TiO_2$, for example. The light-guiding property of the carrier is disrupted "at the bottom" by the phosphor layer 6. Light is coupled out in the forward direction. The red light is therefore extracted with a single scattering process from the lamp. Multiple scattering processes of the red light are drastically less probable than in the known solution. In principle, the coupling-out of light in tachometer needles or side-illuminated LCD backlights functions in a similar way. The novel feature here is the use of a phosphor which is absorption-free in the red as possible in the layer 6 as a component used for coupling out. Suitable here in particular is a green-emitting phosphor of the type garnet $A_3B_5O_{12}$: Ce, in particular YAGaG:Ce, which at the same time contains aluminum and gallium. Primarily suitable as component A is Y and/or Lu. Advantageously, a garnet with the cation A=Lu is suitable as phosphor for a peak wavelength of the primary radiation in the range 430 to 450 nm, in particular up to 445 nm, and wherein B at the same time has contents of Al and Ga, in particular contains from 10 to 40 mol. % of Ga, in particular from 20 to 30%, in component B, with the rest being Al.

The carrier element 5 can and should be structured in such a way that the coupling-out of light in the red is adjusted in such a way that an emission is achieved which is as homogeneous as possible and the red light is coupled out as far as possible prior to reaching the lateral wall 8 of the disk which is opposite the individual red LED 3. Ideally, the path length of the red light is therefore smaller than the diameter of the carrier element or substrate 5.

This arrangement provides a very compact light source for white light which has good homogenization.

Figure 3A:
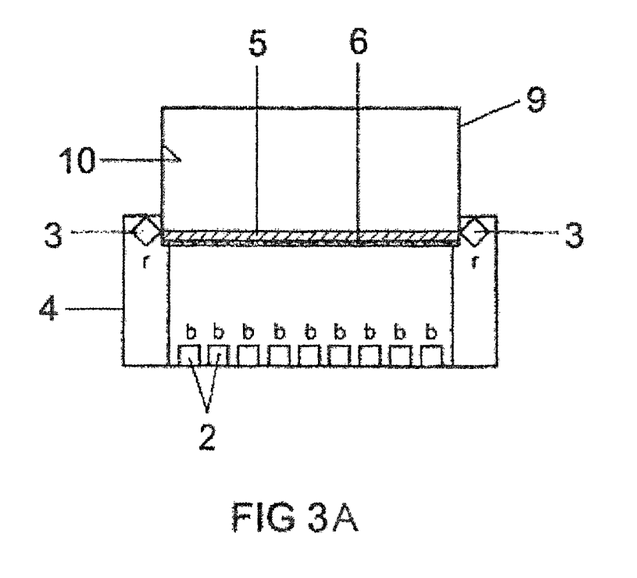
FIGS. 3A and 3B show a novel light system, second exemplary embodiment.
Figure 3B:
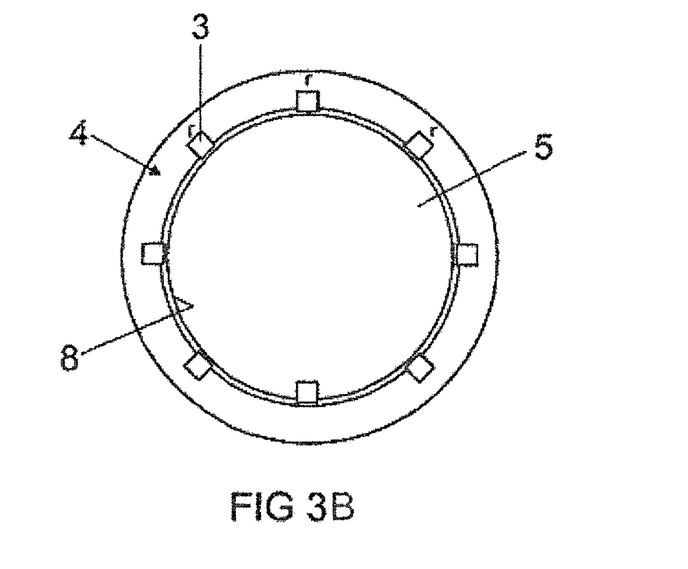

FIGS. 3A and 3B show a further exemplary embodiment, in which the substrate 5 is relatively thin, and in which the red LEDs 3 are fitted above the substrate 5. They are arranged angled upwards in the radiation direction. A tubular optical waveguide 9 is fitted as optical element above said LEDs, with the inner wall 10 of said optical waveguide having a reflective effect, either as a result of total internal reflection or owing to a reflective coating. In this case, the light is first mixed in the optical waveguide.

Depending on the desired impact direction, such as, for example, as high a color rendering index (CRI) as possible, as high an efficiency as possible, a specific color gamut or a compromise which is desired in any case between these variables, the conversion LED/phosphor/red LED system needs to be adjusted differently, also depending on the desired light color.

The blue LEDs, dominant wavelength at 430 to 470 nm, need to be appropriate for the selected phosphor; preferred are garnets which are derived from YAG:Ce, i.e. $A_3B_5O_{12}$: Ce, with A=Y and/or Lu being preferred and B=Al and/or Ga being preferred. A cold-white LED (4500 to 5500 K) is mentioned by way of example, with in this case simply YAGaG:Ce with 10% Ga preferably being used, in which case the optimum LED wavelength is about 460 nm (455 to 465 nm). For a cool white neutral white light color (in particular approximately 3800 to 4000 K), YAGaG with a gallium content of 15 to 35%, with the rest being aluminum, should preferably be used. In this case, the optimum LED wavelength is around 450 nm (445 to 455 nm). In the case of a warm white light color (2700 to 3000 K), LuAGaG with a gallium content of 15 to 35%, with the rest being aluminum, should preferably be used. In this case, the optimum LED wavelength is around 438 nm (433 to 443 nm).

Correspondingly, the wavelength of the red LED also needs to be matched. The red proportion of the spectrum should be very predominantly between 600 and 630 nm (dominant wavelength). A narrow-band short-wave emission (preferably FWHM of less than 25 nm) is preferable in respect of high efficiency, but a broadband red emission (preferably FWHM 30 to 50 nm) provides advantages in respect of good color rendering. A relatively long-wave red emission in the range 620 to 650 nm (dominant wavelength) enlarges the achievable color gamut. The influence of a wavelength drift of the red LED is minimal at a dominant wavelength in the range 600 to 610 nm since the maximum for the red sensitivity of the human eye is in this range.

Figure 4:
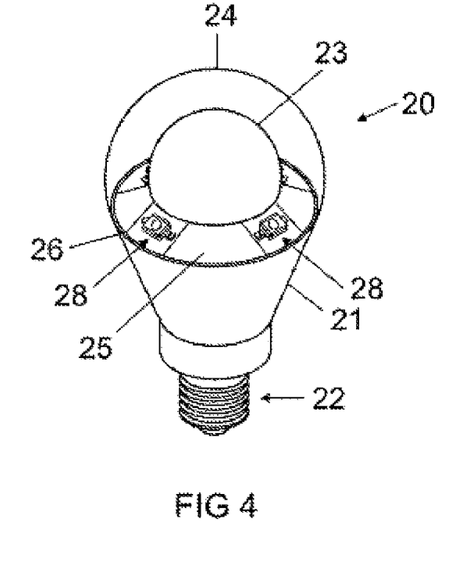
FIG. 4 shows an LED lamp as a realization of the light system.

FIG. 4 shows, as a light system, a white-emitting LED lamp 20, with a basic part 21 which contains electronics, a base 22 attached thereto at the bottom, an inner dome 23 and an outer dome 24. In a similar manner to as shown in FIG. 2a, blue-emitting LEDs are introduced on the basic part in the center (not visible; see FIG. 2a). The inner dome 23 is uniformly coated with phosphor, which converts some of the primary radiation of the blue LEDs into yellow to green radiation. In particular a garnet such as YaGaG:Ce or LuAGAG:Ce or another garnet of the formula A3B5O12: Ce are suitable for this purpose. A plurality of LEDs 28 which emit in a longer wavelength and emit in particular red or magenta or orange are positioned on a collar part 25 of the basic part, adjacent to the rim 26 of the basic part. They are preferably spaced uniformly apart from one another. Particularly preferably, the collar part 25 is realized as a circular ring and is slightly beveled and inclined outwards, as illustrated.

Mixing to give white is performed by means of a diffuser layer or a scattering layer on an outer dome 24, which surrounds both the inner dome 23 and the circular ring 25 with the red LEDs 28. Overall this results in a compact white-emitting LED lamp 20.

Figure 5:
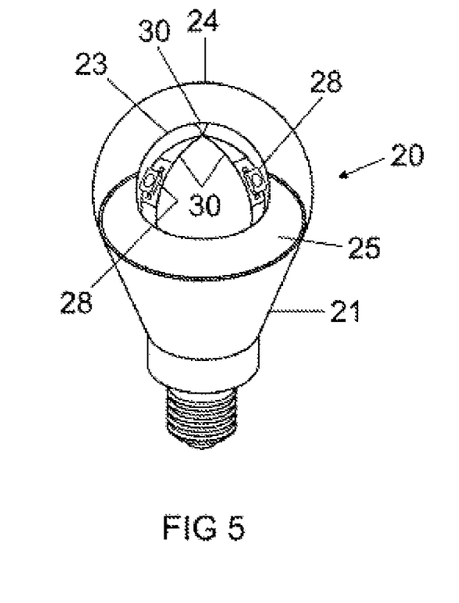
FIGS. 5 and 6 each show a further exemplary embodiment of an LED lamp.

FIG. 5 shows a particularly preferred exemplary embodiment of an LED lamp 20, which has a similar construction to that described in FIG. 4. In contrast to this, however, the red LEDs 28 are not fitted on the circular ring 25. Instead, they are mounted in strip-like sections 30, which are applied on the inner dome 23 and can be free of phosphor. These strip-like sections 30 can be oriented in polar fashion, i.e. virtually along lines of latitude of the dome 23. In particular, two to four such polar strips 30 can be used, which are spaced uniformly apart from one another. Preferably, in this case a red LED 28 rests on a strip 30, but it is also possible for two to four red LEDs to be accommodated on such a strip 30.

Figure 6:
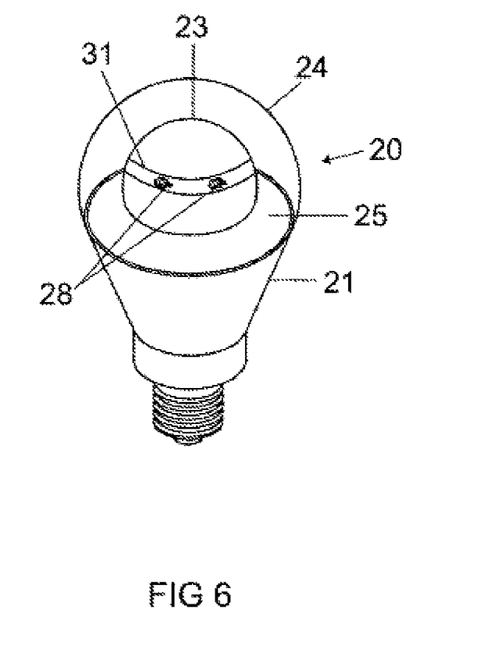

FIG. 6 shows a further exemplary embodiment of an LED lamp 20, in which an equatorial strip 31 is used, which runs peripherally on the inner dome 23 and on which the red LEDs 28 are mounted. In general, it is also possible for a plurality of parallel strips which are oriented along lines of longitude to be used. In this case, in general two to five LEDs can be accommodated on one strip.

The strips can also be oriented at an angle to the lines of longitude or lines of latitude of the inner dome 23.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A light system comprising:
   at least one first chip capable of emitting a primary radiation;
   a layer containing a phosphor mounted in front of the first chip, for at least partially converting the primary radiation into a secondary radiation;
   at least one second chip capable of emitting a second primary radiation with a greater wavelength than the primary radiation; and
   a substrate,
   wherein the layer is arranged spaced apart from the first chip,
   wherein the second chip is arranged in such a way that its radiation is substantially not absorbed by the phosphor, and
   wherein the thickness of the substrate is sufficient to be able to arrange the second chips at the lateral rim of the substrate, with the result that the radiation from said chips is coupled into the substrate.

2. The light system as claimed in claim 1, wherein the first chip emits blue, and wherein the second chip emits orange to red.

3. The light system as claimed in claim 1, wherein the phosphor absorbs blue radiation and emits green to yellow radiation.

4. The light system as claimed in claim 1, wherein at least one phosphor is selected from the group consisting of oxinitridosilicates, orthosilicates, sialons, garnets which are derived from YAG:Ce.

5. The light system as claimed in claim 1, wherein the first chip is realized as an array on a substrate.

6. The light system as claimed in claim 1, wherein the layer is applied to a transparent disk in front of the first chip in a radiation direction.

7. The light system as claimed in claim 1, wherein the second chip is realized as an array which has been grouped externally around the rim of a disk and which is arranged above the layer, when viewed in a radiation direction.

8. The light system as claimed in claim 1, wherein the phosphor has a garnet which contains gallium and aluminum.

9. The light system as claimed in claim 1, wherein the light system has a pot-like housing, wherein the first chip is applied to the base of the pot, and wherein the layer acts as a cover for the pot.

10. The light system as claimed in claim 1, wherein the second chip has been inserted upwards at an angle in a radiation direction.

11. The light system as claimed in claim 1, wherein an optical element is applied above a disk, which optical element mixes the radiation of both chips to give white on the basis of the RGB mixing principle.

12. A light system comprising:
   at least one first chip capable of emitting a primary radiation;
   a layer containing a phosphor mounted in front of the first chip, for at least partially converting the primary radiation into a secondary radiation; and
   at least one second chip capable of emitting a second primary radiation with a greater wavelength than the primary radiation,
   wherein the layer is arranged spaced apart from the first chip,
   wherein the second chip is arranged in such a way that its radiation is substantially not absorbed by the phosphor,
   wherein the light system is an LED lamp, wherein the phosphor is applied to a first dome, which arches over the first chips, and wherein the second chips are positioned within a second dome, but at the same time outside the first dome, wherein the second dome has a scattering means for mixing the radiation of both chips.

13. The light system as claimed in claim 12, wherein the LED lamp has a basic part, from which the two domes arch, wherein the basic part has a peripheral circular ring, on which the second chips are mounted.

14. The light system as claimed in claim 12, wherein the second chips are applied externally to the first dome, in particular to strip-like bands.

* * * * *